(No Model.)
A. DE DION, G. BOUTON & F. CHAPLET.
DIFFERENTIAL GEARING.
No. 588,856. Patented Aug. 24, 1897.
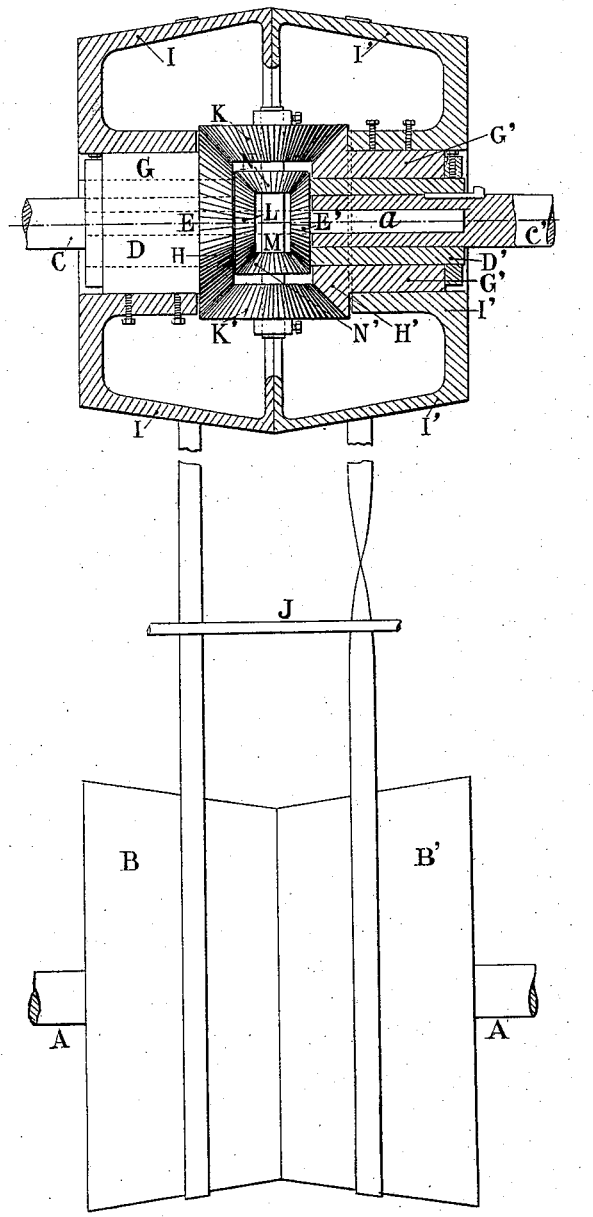
Witnesses
Geo. N. Rea
Robert Brockett
Inventors.
Compte Albert de Dion
Georges Bouton
Frédéric Chaplet.
By James L. Norris
Atty.

UNITED STATES PATENT OFFICE.

ALBERT DE DION, GEORGES BOUTON, AND FRÉDÉRIC CHAPLET, OF PARIS, FRANCE.

DIFFERENTIAL GEARING.

SPECIFICATION forming part of Letters Patent No. 588,856, dated August 24, 1897.

Application filed March 23, 1897. Serial No. 628,914. (No model.) Patented in France January 3, 1895, No. 244,094.

*To all whom it may concern:*

Be it known that we, ALBERT DE DION, GEORGES BOUTON, and FRÉDÉRIC CHAPLET, citizens of France, residing at Paris, in the Department of the Seine, France, have invented certain new and useful Improvements in Differential Gearing, (for which we have obtained a patent in France, No. 244,094, dated January 3, 1895,) of which the following is a specification.

This invention relates to mechanism for transmitting motion, and has for its object to provide improved means for transmitting motion differentially from a driving to a two-part-driven shaft in such manner that the driven shaft may be started slowly and stopped at full speed, may be reversed, and in which the two parts of the driven shaft may rotate independently of one another when subjected to unequal resistances.

To these ends our invention consists in the features and in the construction, combination, or arrangement of parts hereinafter described, and particularly pointed out in the claims following the description, reference being had to the accompanying drawing, forming a part of this specification, wherein is shown a view of our improved mechanism, partly in plan and partly in section.

Our device is primarily intended for the transmission of the power from the motor to the axle of mechanically-driven vehicles or "horseless carriages," but it will be manifest that it may be usefully employed for many other purposes.

Referring to the drawing, the letter A indicates the driving-shaft, which may receive its motion from any suitable source of power. Mounted on the shaft A are two cone-pulleys B B', having their small ends adjacent. The driven shaft consists of two shafts C C', loosely mounted at their adjacent ends on a journal-pin $a$ and constituting the axle of the vehicle. On the inner ends of the shafts C C' are arranged sleeves D D', which are keyed to said shafts, as shown. Formed on or fixed to the ends of the sleeves D D' are beveled pinions E E' of the same size. Loosely arranged on the sleeves D D' are sleeves G G', having cast integrally therewith or attached thereto beveled gear-wheels H H'. Cone-pulleys I I' are respectively fixed on the sleeves G G', the larger ends of the cones being adjacent, the arrangement of the pulleys I I' being thus the reverse of that of the pulleys B B'. Gearing with the gear-wheels H H' are two beveled wheels K K', which are loosely journaled on the opposite ends of a shaft L. The shaft L is centrally provided with an eye M, through which passes the journal-pin $a$. Beveled pinions N N' are loosely journaled on the shaft L and gear with the beveled pinions E E'. The pulleys B I are connected by a straight belt O, while the pulleys B' I' are connected by a crossed belt O', the arrangement being such that the pulleys I I' are driven in opposite directions. The belts O O' may be shifted on the pulleys by a belt-shifter J of any suitable or approved construction.

The operation of our improved mechanism is as follows, it being assumed that the device is employed for the propulsion of a vehicle of which the shafts C C' constitute the axle.

Let it be assumed that the shaft A is rotated, any suitable motor being employed for the purpose, and that the belts have been shifted to such a position as to cause the pulleys I I' to revolve at the same speed in opposite directions. The sleeves G G' being fixed to the pulleys I I', the gear-wheels H H' will also be rotated at the same speed in opposite directions, and hence the gear-wheels K K' will be rotated idly about their own axes, and no motion will therefore be imparted to the shafts C C' constituting the axle, and the vehicle will remain in a state of rest. If, now, the belts be shifted to one side or the other, the pulleys I I' will be driven at different speeds, thus driving the wheels H H' at different speeds also, and the wheels K K' will then have a planetary movement and will turn the shaft L in a vertical plane about the pin $a$ as a center. The wheels N N', moving with the shaft L and gearing with the pinions E E', will rotate the latter in the same direction and with them the shafts C C'. The vehicle will thus be driven forward or backward and at a speed according to the direction and the distance to which the belts have been shifted, as it will be readily understood that the direction of movement is dependent upon which of the wheels H H' is caused to move the faster. If the resistance offered by one of the shafts C or C' is greater than that of the other—as, for example, when the vehicle is turning—such difference of resistance will cause the pinions N N' to turn on their axes and relieve the shafts C C' of torsional strain.

It will be understood that by making the difference of speed of rotation of the pulleys I I' but slight the speed of the shafts C C' will be little, and hence the vehicle can be started gently and the speed gradually increased by gradually increasing the difference in the speed of rotation of said pulleys. The vehicle can also be instantly stopped while going at full speed without reducing the speed of the driving-shaft by shifting the belts so as to cause the pulleys I I' to rotate at the same speed when their motion will no longer be communicated to the shafts C C', as before described.

While we have described our device as applied to the propulsion of vehicles, it will be readily understood that it may be employed for many other purposes.

Having described our invention, what we claim is—

1. The combination with a two-part shaft the parts of which are journaled together, of pulleys rotatably supported on said shafts, means for driving said pulleys in opposite directions at both the same and different speeds, and gearing driven by said pulleys and operating when the pulleys are driven at different speeds to drive the two-part shaft, but rendered inoperative when the pulleys are driven at the same speed, substantially as described.

2. The combination with a driving-shaft and reversely-coned pulleys fixed thereon, of a two-part driven shaft the parts of which are journaled together, cone-pulleys rotatably supported thereon and inclined reversely to one another and to the pulleys on the driving-shaft, belts connecting the pulleys on the driving and driven shafts so as to drive the latter in opposite directions, a belt-shifter for shifting the belts to cause said pulleys to rotate at the same or different speeds, and gearing driven by said pulleys and operating when the pulleys are driven at different speeds to drive the two-part shafts, but rendered inoperative when the pulleys are driven at the same speed, substantially as described.

3. The combination with the driving-shaft A and the reversely-coned pulleys B, B', fixed thereon, of the shafts C, C', journaled together, the sleeves D, D', fixed thereon and provided with gear-wheels E, E', the sleeves G, G', loosely journaled on the sleeves D, D', and provided with gear-wheels H, H', cone-pulleys I, I', reversely inclined to one another and to the pulleys B, B', and fixed on the sleeves G, G', gear-wheels K, K' loosely mounted on the opposite end of a shaft L and gearing with the wheels H, H', gear-wheels N, N', journaled on said shafts L and gearing with the wheels E, E', a straight belt O connecting the pulleys B, I, a crossed belt O' connecting the pulleys B', I', and a belt-shifter for simultaneously shifting said belts, substantially as described and for the purpose specified.

In testimony whereof we have hereunto set our hands in presence of two subscribing witnesses.

ALBERT DE DION.
GEORGES BOUTON.
FRÉDÉRIC CHAPLET.

Witnesses:
EDWARD P. MACLEAN,
HIPPOLYTE JOSSE.